United States Patent [19]

Nazri

[11] Patent Number: 5,604,057
[45] Date of Patent: Feb. 18, 1997

[54] SECONDARY CELL HAVING A LITHIUM INTERCOLATING MANGANESE OXIDE

[75] Inventor: Gholam-Abbas Nazri, Bloomfield Hills, Mich.

[73] Assignee: General Motors Corporation, Detroit, Mich.

[21] Appl. No.: 562,862

[22] Filed: Nov. 27, 1995

[51] Int. Cl.$^6$ .................................................. H01M 2/02
[52] U.S. Cl. ............................ 429/224; 429/218; 423/605
[58] Field of Search .......................... 423/605; 429/218, 429/224

[56] References Cited

U.S. PATENT DOCUMENTS

| | | | |
|---|---|---|---|
| 4,507,371 | 3/1985 | Thackerav et al. | 429/191 |
| 5,017,445 | 5/1991 | Ashihara et al. | 424/224 |
| 5,135,732 | 8/1992 | Barboux et al. | 423/593 |
| 5,169,736 | 12/1992 | Bittihn et al. | 429/194 |
| 5,192,629 | 3/1993 | Guyomard et al. | 429/197 |
| 5,196,279 | 3/1993 | Tarascon | 429/194 |
| 5,277,890 | 1/1994 | Wang et al. | 423/605 |
| 5,294,499 | 3/1994 | Furukawa | 429/164 |
| 5,336,572 | 8/1994 | Koksbang | 429/218 |
| 5,489,493 | 2/1996 | Urry | 429/224 |

OTHER PUBLICATIONS

Ferg et al, Spinel Anodes for Lithium–Ion Batteries, J. Electrochem Soc vol. 141, No. 11, Nov. 1994, The Electrochemical Society, Inc., pp. L147–L150.

Furukawa et al, Lithium batteries with polymer electrodes, Applications of Electroactive Polymers, Edited by Bruno Scrosati, Chapman & Hall, pp. 150–181 (1990).

Bach et al, Sol–Gel Synthesis of Manganese Oxides, Journal of Solid State Chemistry 88, pp. 325–333 Mar. 14, 1990.

Shacklette et al, Secondary Batteries with Electroactive Polymer Electrodes, Synthtic Metals, 18 (1987) pp. 611–618 (month N/A).

Osaka et al, Electroactive Polyaniline Film Deposited from Nonaqueous Media, J. Electrochem Soc vol. 138, No. 10, Oct. 1991, The Electrochemical Society, Inc. pp. 2853–2858.

Rossouw et al, Structural Aspects of Lithium–Manganese–Oxide Electrodes for Rechargeable Lithium Batteries, Mat Res Bull, vol. 25, pp. 173–182, (1990) (Month N/A).

Levy et al, Sol–Gel Processing of Optical and Electrooptical Materials, Advanced Materials (1995) 7, No. 2 (month N/A).

Hunter, Preparation of a New Crystal Form of Manganese Dioxide; λ–MnO, Journal of Solid State Chemistry 39, 142–147 (1981) (month N/A).

*Primary Examiner*—M. Nuzzolillo
*Attorney, Agent, or Firm*—Lawrence B. Plant

[57] ABSTRACT

A secondary lithium ion cell having an anode, a cathode and a nonaqueous electrolyte wherein the cathode comprises sub-micron-size amorphous, microporous, lithium-intercalateable manganese oxide having an internal surface area greater than about 100 m$^2$/g. The cathode may include an electrically conductive lithium-intercalateable polymer binder. A sol-gel process for making the amorphous quatravalent manganese oxide is disclosed.

6 Claims, 8 Drawing Sheets

5,604,057

SECONDARY CELL HAVING A LITHIUM INTERCOLATING MANGANESE OXIDE

This invention relates to secondary, lithium-ion cells having amorphous, quatravalent, Li-intercalateable manganese oxide cathodes, and a method of making same.

BACKGROUND OF THE INVENTION

Secondary, lithium-ion cells and batteries are well known in the art. One such lithium-ion cell comprises essentially a lithium-intercalateable carbonaceous anode, a lithium-intercalateable, chalcogenide cathode, and a non-aqueous, lithium-ion-conducting electrolyte therebetween. The carbon anode comprises any of the various forms of carbon (e.g., coke or graphite fibers) pressed into a porous conductor or bonded to an electrically conductive carrier (e.g. copper foil) by means of a suitable organic binder. A known chalcogenide cathode comprises a crystalline spinel form of manganese oxide bonded to an electrically conductive carrier (e.g., aluminum foil) by a suitable organic binder such as ethylene propylene diene monomer (EPDM).

Lithium-ion cell electrolytes comprise a lithium salt dissolved in a vehicle which may be (1) completely liquid, or (2) an immobilized liquid, (e.g., gelled, or entrapped in a polymer matrix), or (3) a pure polymer. Known polymer matrices for entrapping the electrolyte include polyacrylates, polyurethanes, polydialkylsiloxanes, polymethacrylates, polyphosphazenes, polyethers, and polycarbonates, and may be polymerized in situ in the presence of the electrolyte to trap the electrolyte therein as the polymerization occurs. Known polymers for pure polymer electrolyte systems include polyethylene oxide (PEO), polymethylene-polyethylene oxide (MPEO) or polyphosphazenes (PPE). Known lithium salts for this purpose include, for example, $LiPF_6$, $LiClO_4$, $LiSCN$, $LiAlCl_4$, $LiBF_4$, $LiN(CF_3SO_2)_2$, $LiCF_3SO_3$, $LiC(SO_2CF_3)_3$, $LiO_3SCF_2CF_3$, $LiC_6F_5SO_3$, and $LiO_2CF_3$, $LiAsF_6$, and $LiSbF_6$. Known organic solvents (i.e., vehicles) for the lithium salts include, for example, propylene carbonate, ethylene carbonate, dialkyl carbonates, cyclic ethers, cyclic esters, glymes, lactones, formates, esters, sulfones, nitriles, and oxazolidinones.

Lithium cells made from pure polymer electrolytes, or liquid electrolytes entrapped in a polymer matrix, are known in the art as "lithium-polymer" cells, and the electrolytes therefor are known as polymeric electrolytes. Lithium-polymer cells are often made by laminating thin films of the anode, cathode and electrolyte together wherein the electrolyte layer is sandwiched between the anode and cathode layers to form an individual cell, and a plurality of such cells are bundled together to form a higher energy/voltage battery. In making such cells, it is desirable that the thin films be flexible and robust so that they can be handled without damage.

While electrodes made from manganese oxide spinels are relatively inexpensive, and produce cells having a desirable high discharge terminal voltage (i.e., 4 volts), they are not without problems. For example, electrodes made therefrom have poor conductivity and require the addition of conductive fillers (e.g., carbon) to enhance conductivity. The addition of such fillers reduces the energy density of the electrode. Moreover, recharging cells requires impressing a voltage thereon which exceeds the discharge terminal voltage of the cell. Hence for cells having manganese oxide spinel cathodes, it takes at least 4.1 volts (and preferably more) to intercalate lithium from the electrode during charging of the cell. Above about 4.5 volts, however, the solvents for the electrolyte oxidize and decompose. Hence, it is necessary to carefully control the charging voltage of such cells below the decomposition potential of the solvent in order to prevent degradation thereof. Furthermore, due to the crystalline structure of spinel manganese oxide, their reversible capacity and cycle life are sensitive to overcharge and overdischarge. Discharge of manganese oxide spinel cells must be cut-off when the terminal voltage falls to about 3.4 volts. This limits the capacity of the material which typically peaks at about 140 mAh/g. Below about 3.4 volts, the spinel form of the manganese oxide undergoes structural transformation when additional lithium is inserted into $LiMn_2O_4$ and it converts to the orthorhombic form which has very poor cycleability, and is very unstable causing the formation of other manganese oxides which are not electrochemically active. Still further, insertion of more than one lithium into spinel manganese oxide results in cation mixing between octahedral and tetrahedral sites which leads to continuous capacity decay. To avoid these problems, the cell voltage must be controlled electronically during the operation of the cell. Such control is very difficult to manage when a number of large lithium cells are coupled together in series. Finally, spinel-type manganese oxide electrodes typically have internal surface areas less than about 40 $m^2/g$, which limit their intercalation capacity and the rate at which they can be discharged and recharged.

SUMMARY OF THE INVENTION

The present invention contemplates a relatively voltage-insensitive manganese oxide electrode for a lithium-ion cell which, compared to spinel manganese oxide electrodes, has (1) a much higher discharge capacity (i.e., as high as 240 mAh/g) and internal surface area (i.e., as high as ca 380 $m^2/g$), and (2) a much lower recharge voltage (i.e., ca. 4 volts) and discharge cut-off voltage (i.e., ca. 2.0 volts). Preferred electrodes according to the present invention include an active material comprising amorphous, microporous, quatravalent, submicron-sized, manganese oxide particles formed by a sol-gel process and having an internal surface area greater than 100 $m^2/g$. A most preferred such active material has the 2 quatravalent manganese oxide particles mixed with an electrically conductive, lithium-intercalateable polymer (e.g., polyaniline or its derivatives) polymerized in situ with the formation of the quatravalent manganese oxide. Electrodes made from such polymers may supplement or replace inert binders, and inert conductive diluents, used heretofore to form electrodes, and thereby increase the capacity of the electrodes. Other conventional binders may also be used in combination with the intercalateable polymer.

The amorphous, manganese oxide of the present invention is made by: (1) dissolving a first manganese compound having a manganese oxidation state (i.e., valence) greater than 4 in a first polar solvent (e.g., water) to form a first solution; (2) dissolving a second manganese compound having a manganese oxidation state less than 4 in a second polar solvent (e.g., water) to provide a second solution; (3) dispersing the second solution rapidly throughout the first solution until substantially all of the first compound is reduced and forms a gel containing said quatravalent manganese oxide; and (4) drying the gel to recover the quatravalent manganese oxide therefrom as submicron-size particles. Electrodes are made therefrom by mixing the manganese oxide with a binder and applying it to a suitable conductive substrate. To achieve large internal surface areas for the quatravalent manganese oxide, the first solution will preferably have a pH less than 7, more preferably less than 5, and most preferably less than about 2. The first manganese compound will preferably comprise a permanganate ion, and the second manganese compound will preferably comprise a manganous salt. Most preferably, the second solution will also contain a liquid, oxidatively polymerizeable polymer precursor (e.g., monomer, or short chain polymer) for forming an electrically conductive, lithium intercalateable polymer binder in situ throughout the amorphous manganese oxide at the molecular level with the conductive polymer apparently being inserted between molecules of manganese oxide. Such intermolecular insertion enhances electrical conductivity to an extent not seen possible by mere mechanical mixing of the components.

DETAILED DESCRIPTION OF THE INVENTION

The invention will better be understood when considered in the light of the following description of certain specific embodiments thereof which is given hereafter in connection with the several Figures in which.

Figure 1:
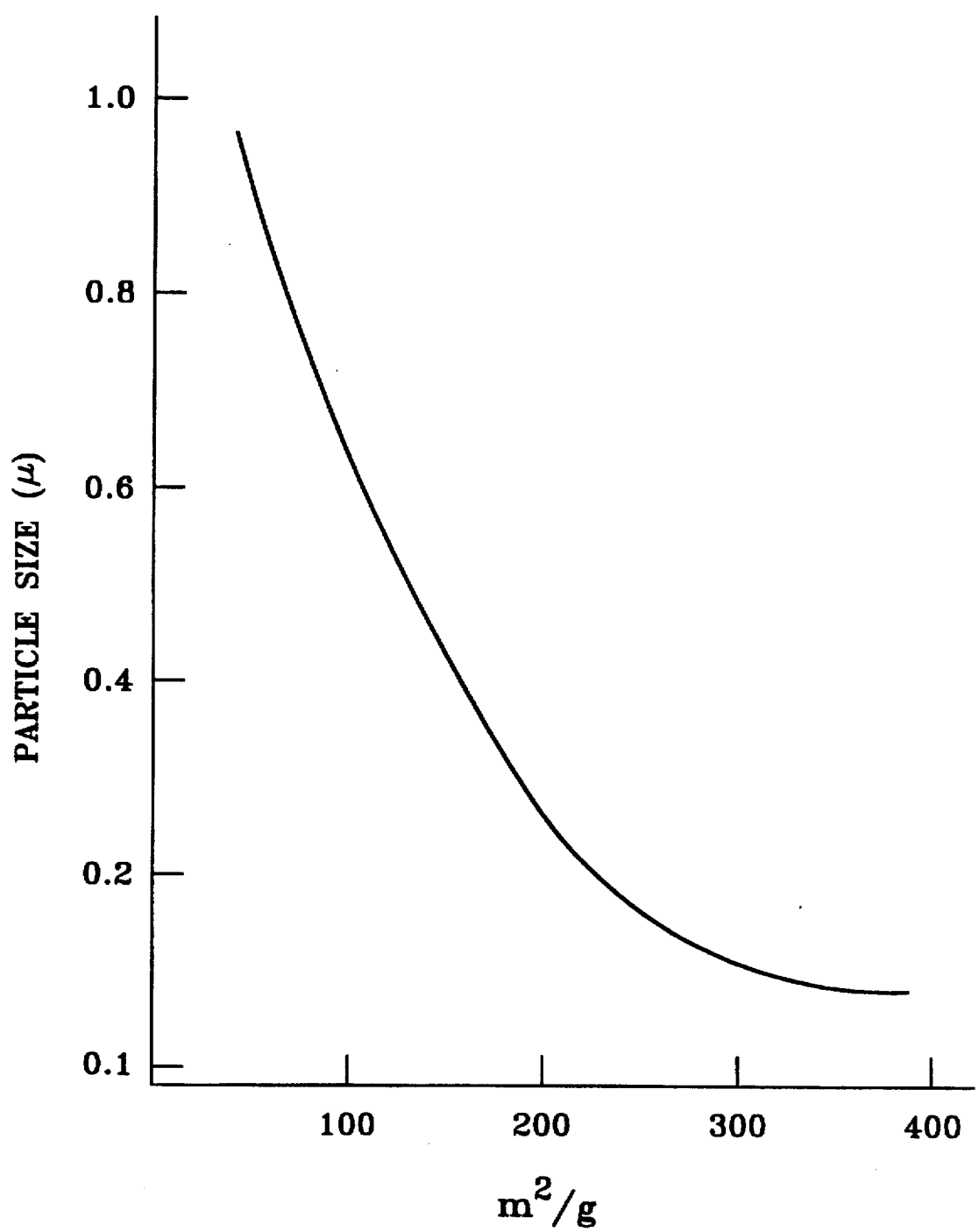
FIG. 1 is a plot of the internal surface area of the amorphous manganese oxide of the present invention as a function of the particle size thereof.

In accordance with the present invention, there is provided a cathode for a lithium-ion cell comprising amorphous, microporous, lithium-intercalateable, quatravalent, submicron-size, manganese oxide particles having an internal surface area greater than about 100 $m^2/g$. The amorphous, quatravalent manganese oxide particles of the present invention are made by a sol-gel process wherein a first solution of a manganese compound having a manganese oxidation state greater than 4 ($Mn^{hi}$) is mixed with a second solution of a second manganese compound having a manganese oxidation state less than 4 ($Mn^{lo}$). The higher oxidation state manganese is reduced and the lower oxidation state manganese is oxidized to form a gel containing quatravalent manganese oxide. The second solution is slowly (preferably, incrementally as by a series of droplets) added and rapidly admixed with the first solution so as to rapidly disperse the second solution throughout the first solution, and thereby form submicron-sized particles of amorphous quatravalent manganese oxide having an internal surface much greater than 40 $m^2/g$ and preferably between about 100 $m^2/g$ and about 380 $m^2/g$. By way of contrast, crystalline spinel-type manganese oxides must be ground to produce small particles, and typically have internal surface areas less than about 40 $m^2/g$. Electrodes made from amorphous manganese oxide have demonstrated capacities greater than about 200 mAh/g in sharp contrast to 140 mAh/g capacity obtained from spinel-type manganese oxide.

The first solution comprises a first manganese compound having a manganese oxidation state greater than 4 and may include such manganese compounds as alkaline permanganates (e.g., sodium permanganate) and alkaline manganates (e.g., potassium manganate). Compounds containing permanganate ions (i.e., $Mn^{+7}$) are preferred, with the alkali metal permanganates being most preferred for their ready availability and solubility in polar solvents. Suitable polar solvents for this purpose include water, cyclic carbonates, linear carbonates, cyclic esters and cyclic ethers. Water is the most preferred polar solvent as it is the least expensive, most readily available and can dissolve as much as 0.5 moles of sodium permanganate at room temperature.

The second solution will comprise having an manganese compound(s) having an oxidation state less than 4, e.g., manganese sulfate, manganese nitrate and manganese acetate. The manganous salts, and particularly manganese nitrate, are most preferred owing to their ready availability, and solubility in polar solvents (preferably water) such as mentioned above for the first solution. The second solution is slowly added (i.e., in small increments/droplets) to the first solution, and rapidly dispersed throughout the first solution to insure the formation of the smallest quatravalent, manganese oxide particles possible upon drying of the gelatinous reaction product formed. In this regard, the first and second solutions react to form a gel which contains the quatravalent manganese oxide, and which, upon drying/ dehydration, gives up the quatravalent manganese oxide in the form of amorphous, high surface area, submicron-sized particles (i.e., typically having diameters less than about 0.3 microns) without the need for any significant grinding or pulverization as is typically required to obtain small particles of spinel manganese oxides. Reduction of the high oxidation state manganese with the low oxidation state manganese and consequent oxidation of the low oxidation state manganese results in the formation of very uniform, quatravalent, manganese oxide which is both amorphous and has an unexpectedly high internal surface area.

Dilute first and second solutions provide the smallest particles which, in turn, correlates to high internal surface areas. Hence, for example, a first solution comprising sodium permanganate having a sodium permanganate concentration less than about 0.3 molar will preferably be reacted with a second solution having a manganous ion (e.g., manganous nitrate) concentration equal to or less than the permanganate concentration. It is desirable to consume all of the permanganate in the reaction because any unreacted permanganate becomes trapped in the pores of the quatravalent manganese oxide, and breaks down upon heating. Excess manganous ion, on the other hand, can readily be washed away from the quatravalent manganese oxide particles, and hence may be used in excess in order to insure complete reaction of the permanganate. Ideally, however, stoichiometric amounts of permanganate and manganous ion will be used so that there is no need to have to deal with any unreacted high or low oxidation state manganese in the residue following drying. In the case of the permanganate solution, it is easy to determine when the permanganate is completely consumed as the permanganate solution starts out as a dark reddish purple color but progressively lightens and losses its color as the manganous ion is added and the permanganate is reduced to quatravalent manganese. When the color completely disappears, the reaction is complete and no additional manganous ion addition is required.

Rapid stirring or mechanical agitation of the first solution is desirable as the second solution is being slowly added thereto. Agitation or rapid stirring of the first solution insures that the second solution is rapidly mixed and dispersed throughout the first solution as it is slowly added thereto in order to insure the formation of submicron sized particles of the quatravalent manganese oxide. While rapid stirring the first solution is a particularly convenient way to intimately mix the solutions together, rapid mixing may also be achieved by injecting or spraying the second solution into a stream of the first solution. Other rapid mixing techniques known to those skilled in the art may also be employed with the goal being to disperse the second solution reactants throughout the first solution before any significant reaction occurs and thereby form submicron size, highly porous quatravalent manganese oxide particles upon drying of the gel formed.

The reaction between the first and second solutions forms a single phase gel containing the quatravalent manganese oxide. The gel is dried to remove the solvent and recover amorphous manganese oxide particles. Hence where water is the solvent, the gel is dewatered and dehydrated. Dewatering of the gel is conveniently accomplished by vacuum filtering the gel to remove much of the water followed by washing the filtrate with distilled water and then heating it (i.e., 100° C.–180° C.) under vacuum to completely dry out the gel and leave a residue of quatravalent, amorphous manganese oxide particles in its stead.

Depending on the conditions used in the sol-gel process, amorphous, quatravalent manganese oxide particles as small as 0.01 microns have been produced having internal surface areas as high as about 380 m$^2$/g. Other conditions have produced particle sizes as large as 0.3 microns having internal surface areas of about 200 m$^2$/g. As a general rule, the internal surface area of the particles varies with the size of the particles. In this regard, FIG. 1 qualitatively illustrates that the internal surface area of the particles increases as the particle size decreases. The trend line of FIG. 1 is based on a subjective analysis of SEM photos of particles and surface area measurements of such particles. Quatravalent manganese oxide particles made in accordance with the present invention will preferably have particle sizes less than about 0.3 microns and internal surface areas greater than about 200 m$^2$/g, though it is recognized that particles having larger particle size and lower internal surface areas (i.e., above about 100 m$^2$/g) may be produced which are still superior to spinel-type manganese oxides used heretofore.

Figure 2:
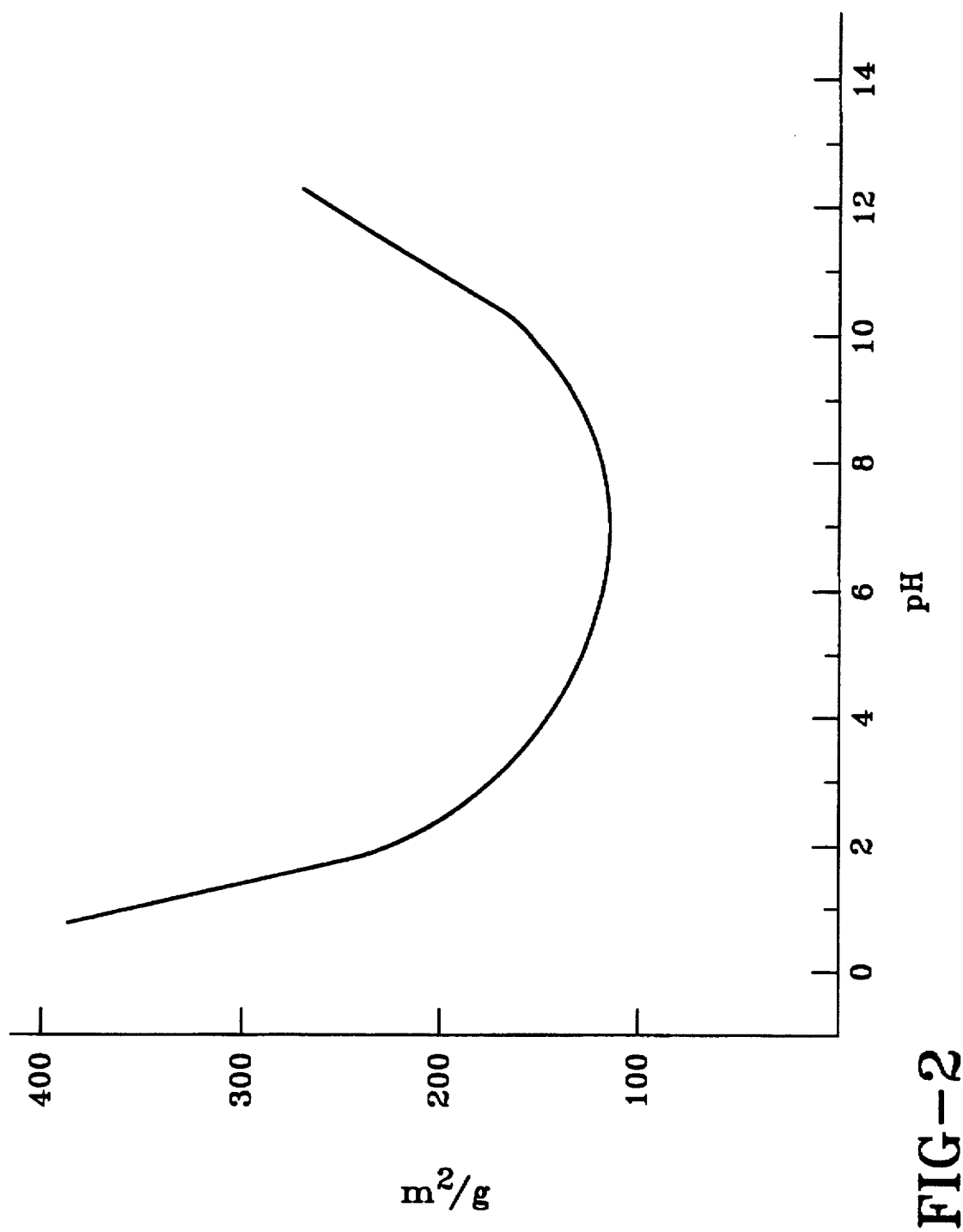
FIG. 2 is a plot of the effects of pH on the internal surface area of the amorphous manganese oxide.

The $Mn^{hi}$-$Mn^{lo}$ oxidation reduction reaction of the present invention will preferably take place in an acidic environment. To this end, the first solution will preferably have a pH less than 7, more preferably less than 5 and most preferably less than about 2. The acidic environment discourages the formation of undesirable oxides such as $Mn_2O_3$, MnO, and MnOOH, and promotes the formation of amorphous manganese oxide having very high internal surface areas. Such high surface area materials have greater current-producing capacity as measured in milliampere hours per gram (mAh/g) of manganese oxide. In this regard, FIG. 2 shows that as the acidity of the reaction environment increases (i.e., the pH decreases) the internal surface area of the amorphous quatravalent manganese oxide increases with the best result being achieved when the pH is below about 2. Excellent results have been obtained at a pH as low as −1. pH is preferably controlled with the use of oxidizing acids such as $HClO_4$ or $H_3PO_4$ which further promote the formation of stable $Mn^{+4}$. Internal surface area determinations were made using Autosorb I equipment from Quanta Chrome Corp. to take BET measurements. This equipment utilizes a static volumetric method to measure the quantity of gas adsorbed or desorbed from a solid surface at some equilibrium vapor pressure. The samples were first outgased at 150° C. for at least 8 hours then cooled down by liquid nitrogen for the adsorption measurements made with nitrogen gas. Pressure charges in the equipment were measured during gas adsorption and desorption and the values used to calculate the surface area.

Preferably, the first solution containing the high oxidation state manganese will be heated to further insure the formation of the more desirable ultra small particles. Heating will preferably be in the range of about 60° C. to about 85° C.

The solvent for both solutions will preferably comprise water, but virtually any polar solvent for the high and low oxidation state manganese compounds will be effective to various degrees. Hence for example, amorphous, quatravalent manganese oxide has been made in accordance with the present invention using propylene carbonate as a solvent for both the permanganate and manganous ions. However, the use of organic solvents slows the process and adds to the cost and complexity thereof without appearing to add any particular advantage thereto. For example compared to water, it is more difficult to remove propylene carbonate solvent from the gel after the gelling reaction is complete. On the other hand, there may be advantages to using different solvents for the two solutions in order to control particle size. Hence using water as the solvent for the first solution and propylene carbonate, or another organic solvent, as the solvent for the second solution may permit better dispersion of the manganous solution throughout the first solution before significant reaction with the permanganate occurs resulting in smaller particles than might otherwise be possible under the same conditions of temperature, concentration and acidity.

Electrodes are made by mixing the amorphous quatravalent manganese oxide particles of the present invention with a suitable binder (e.g., EPDM) in a solvent, coating the mix onto a suitable electrically conductive support (i.e., aluminum foil) and removing the solvent (e.g., as by heat) to adhere the manganese oxide to the support, as is well known in the art. Coating may be effected by spraying, spin-coating, blade-coating, electrostatic spraying, painting, etc. Some conductive carbon particles may be mixed with the manganese oxide to improve its electrical conductivity as is also well known in the art. Such electrodes will typically comprise about 3% to about 10%, by weight, binder, and about 5% to about 15%, by weight, conductive carbon particles.

In accordance with a most preferred embodiment of the present invention, a lithium-intercalateable and electrically conductive polymer is formed in situ during the oxidation-reduction reaction that forms the quatravalent, manganese oxide. Such a polymer not only enhances the electrical conductivity of the amorphous manganese oxide active material, but function at least partly, if not totally, as a binder for the manganese oxide material which increases the lithium intercalation capacity of electrodes made therefrom as compared to electrodes made entirely from inert binders. Hence, the polymers of the most preferred embodiment perform three functions to-wit: (1) binder, (2) conductivity enhancer, and (3) Li-intercalation capacity enhancer. By adjusting the amount of such polymer in the manganese oxide active material, it is possible to adjust (1) the electrical conductivity of the active material, and (2) the flexibility/durability of films formed therefrom. Use of such polymers reduces the amount of inert carbon particles otherwise needed to provide conductivity. Hence whereas without such polymer the carbon particle loading would typically be about 10%–15% by weight, with the conductive polymer the carbon loading can be reduced to about 5% with a corresponding increase in capacity owing to the Li-intercalateability of the polymer. Similarly, such a polymer can also replace much or all of the ineert binder typically used heretofore with a corresponding increase in capacity. As the electrically conductive, Li-intercalateable polymer has less intercalateable capacity (e.g., ca 100 mAh/g for polyaniline) then the amorphous, quatravalent manganese oxide, the concentration of the polymer should be kept to a minimum consistent with the electrical conductivity and flexibility/durability requirements of electrodes made therefrom. In other words, as the polymer concentration increases the conductivity, flexibility and durability of the electrode increases, but at some sacrifice to the lithium intercalateability of the electrode. The concentration of the conductive polymer binder in the manganese oxide mix will generally be about 10% to about 20% by weight. A preferred conductive/intercalateable polymer comprises polyaniline or its derivatives (e.g., alkyl polyanilines) produced by the in situ oxidation of precursors thereof (e.g., aniline monomer or short chain aniline polymer). A number of other polymers known to be conductive, intercalateable and capable of being polymerized by oxidation by the permanganate ion includes polythiophene, polypyrrole and their derivatives, and are also seen to be effective binders. Corresponding liquid monomer or short chain polymer precursers having at least one repeating unit will be added to the reaction mix. In accordance with the preferred embodiment, the concentration of the aniline precursers in the second solution (i.e., $Mn_{lo}$) will vary from about 5 mol percent to about 30 mol percent relative to the manganous ion concentration therein. The oxidation power of the $Mn^{hi}$ solution is sufficient to polymerize the aniline monomer to polyaniline when aniline (a reducing agent) is present. The concentration of the $Mn_{lo}$ in the second solution can be reduced by the amount of reducing power provided by the presence of aniline therein. By way of example, the stoichiometry of manganous, manganate and aniline can be obtained from:

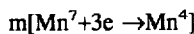

$m[Mn^7+3e \rightarrow Mn^4]$

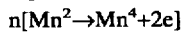

$n[Mn^2 \rightarrow Mn^4+2e]$

$p[aniline \rightarrow polyaniline+e]$ yielding a net reaction:

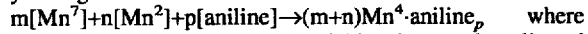

$m[Mn^7]+n[Mn^2]+p[aniline] \rightarrow (m+n)Mn^4 \cdot aniline_p$ where $3m=2n+p$ and n and p are variables that can be adjusted to control capacity, electrical conductivity and mechanical flexibility of the electrode material.

To function as a binder the electrically conductive, lithium intercalateable binder must be coalesced. This can be effected by hot pressing or by mixing the polymer-$MnO_2$ composite with a solvent for the polymer followed by removing (e.g., evaporating) the solvent. Polyaniline, for example, can be fused together at about 250° C. or dissolved in such solvents as doocylbenzene sulfonic acid, decahydronaphthalene, or their derivatives. Any heating of the composite material should be kept below about 400° C. to prevent crystallization of manganese oxide.

TESTS

Figure 4:
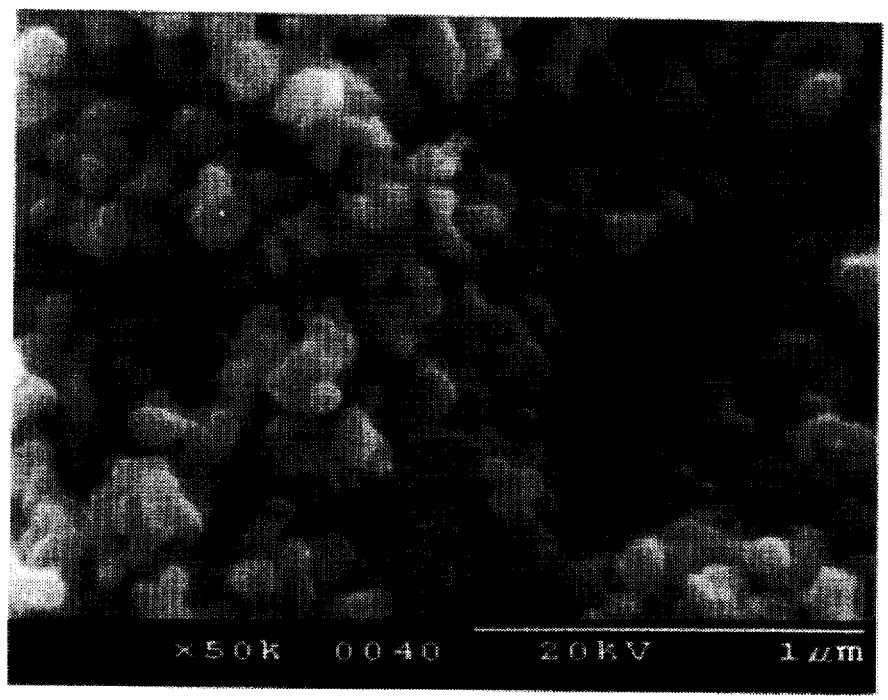
FIG. 4 is a scanning electron microscope (SEM) photo (i.e., at 50 K magnification) of the amorphous manganese oxide of the present invention.
Figure 5:
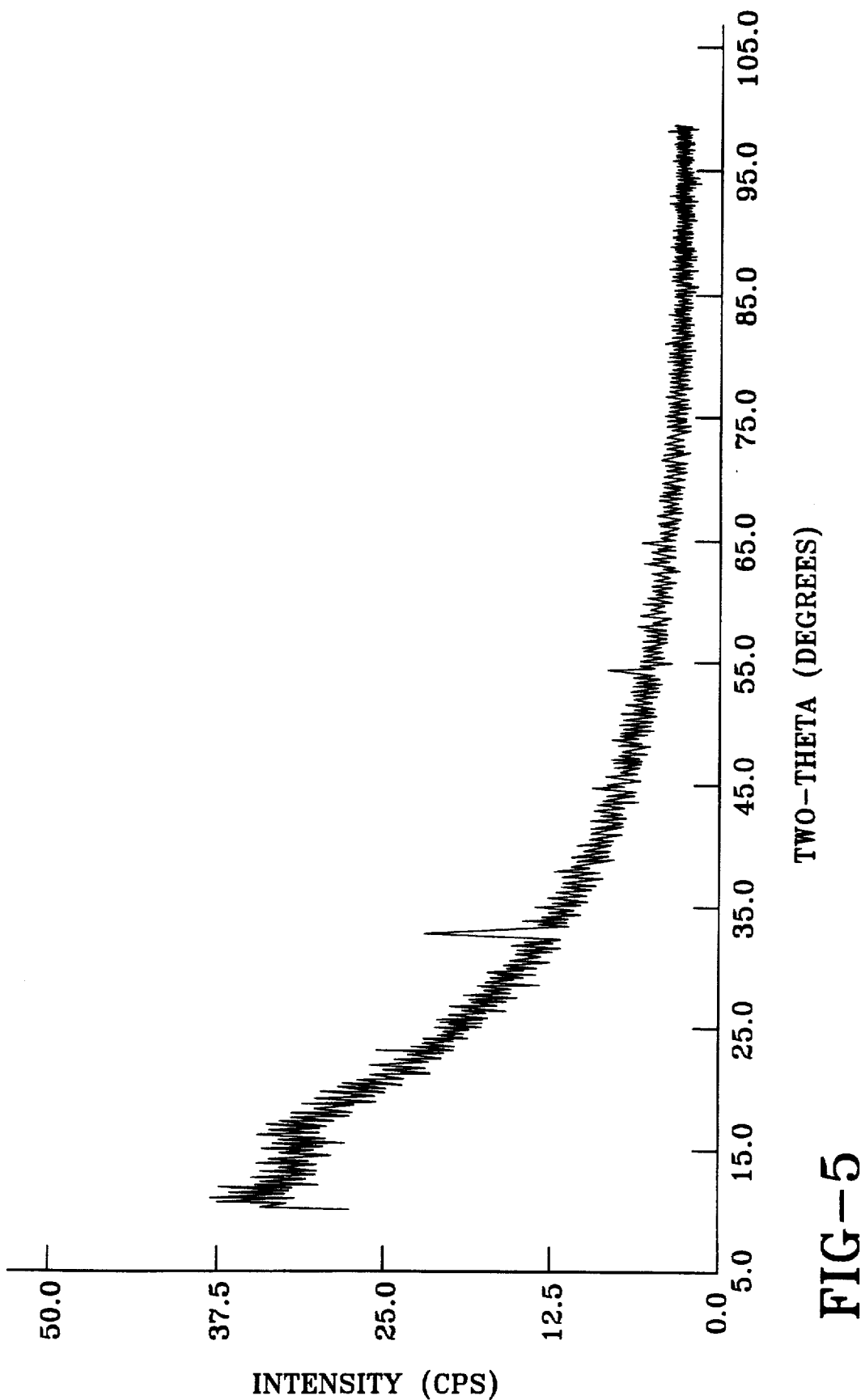
FIG. 5 is an X-ray diffraction pattern of the amorphous manganese oxide of the present invention.

Example 1—a batch of amorphous, quatravalent manganese oxide was made by: (1) preparing one (1) liter of a first aqueous solution comprising 0.25 mole of sodium permanganate and adjusting its pH to 1 with $HClO_4$; (2) preparing a second aqueous solution comprising 0.35 moles of manganese nitrate in 1 liter; (3) heating the first solution to a temperature of 80° C. while mechanically agitating it; (4) adding 1 liter of the second solution to the first solution as a series of successive droplets until the mix gelled and the purplish color of the first solution disappeared; (5) filtering the gel under a vacuum of $10^{-3}$ Torr; (6) rinsing the filtrate with distilled water; and (7) drying the filtrate at 180° C. under a $10^{-3}$ Torr vacuum for eight (8) hours. The material thusly made was subjected to X-ray diffraction analysis. The X-ray diffraction pattern is shown in FIG. 5. The pattern shows the amorphous character of the manganese oxide produced with the peaks at 32 and 56 (two theta) being attributed to the sample holder. A scanning electron microscope photograph of this material is shown in FIG. 4.

Figure 3:
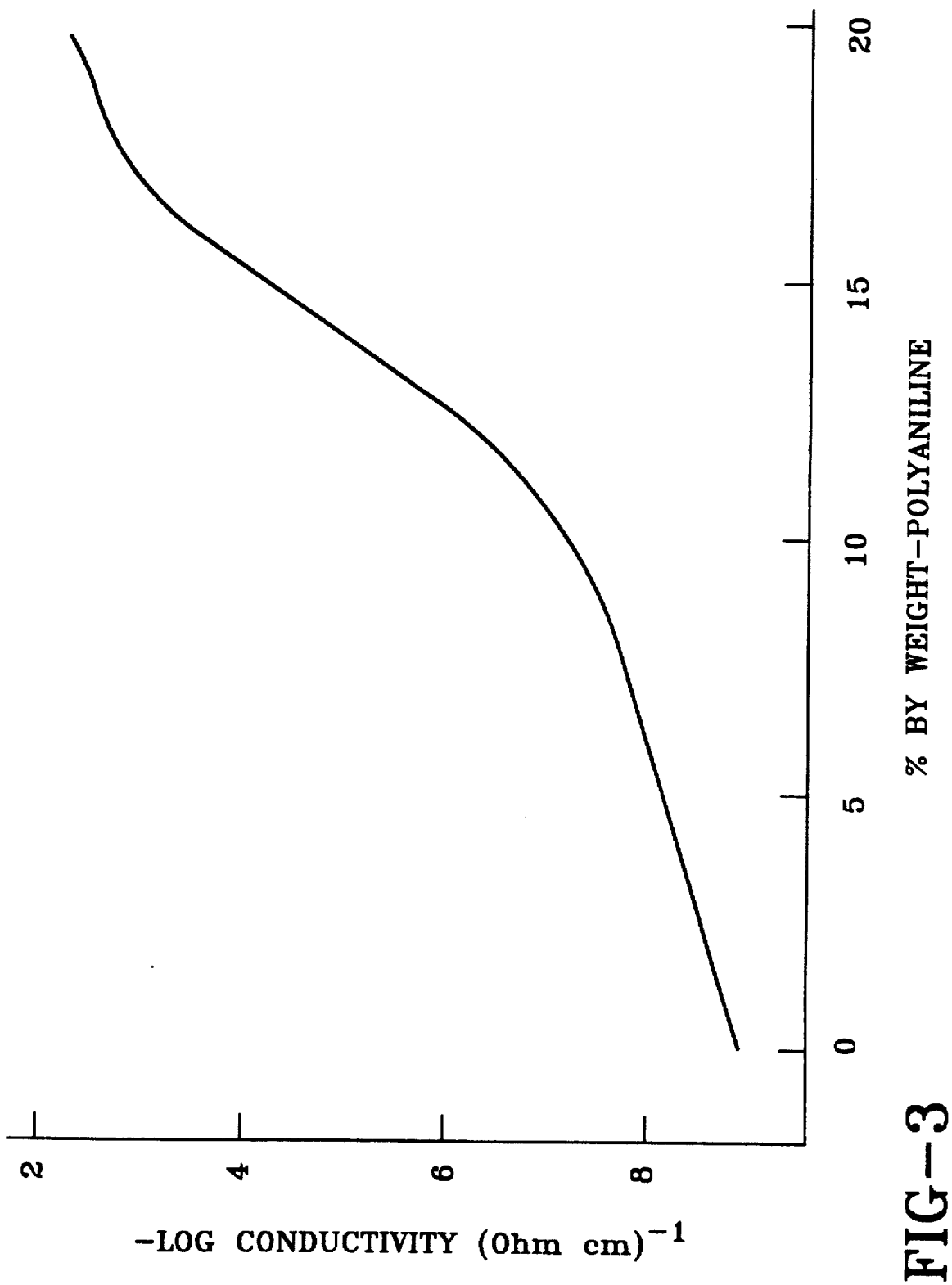
FIG. 3 is a plot of the electrical conductivity of the amorphous manganese oxide as a function of the concentration of polyanaline therein.

Example 2—a number of samples were made as set forth in Example 1 with varying concentrations of polyaniline conductive polymer present in the finished product. The electrical conductivity of the various samples was measured and plotted in FIG. 3 as a function of polyaniline concentration. The plot shows that as polyaniline concentration increases the conductivity of the composite increases.

Figure 6:
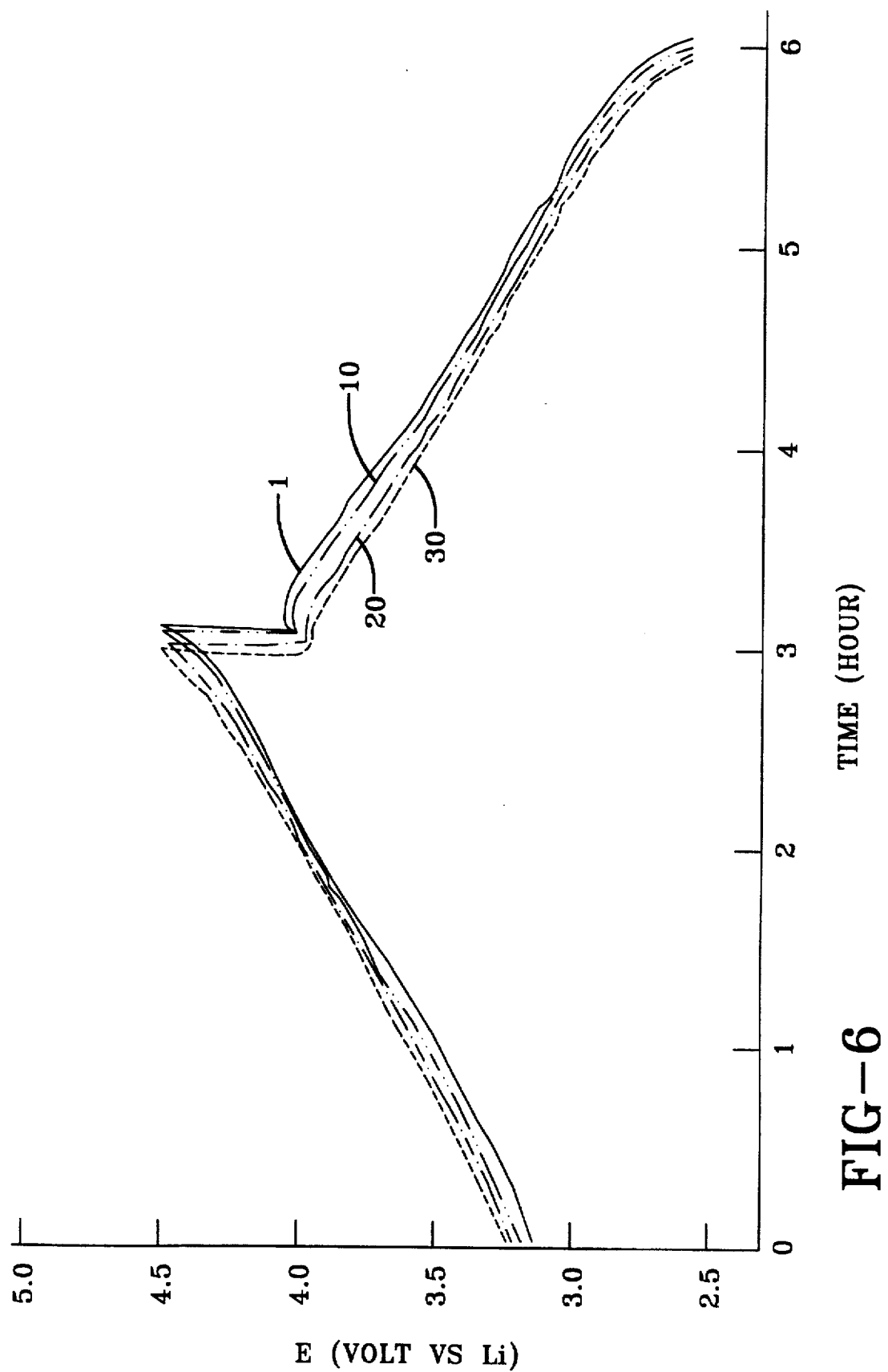
FIG. 6 shows the voltage profiles of an electrode made from the amorphous manganese oxide of the present invention at different stages during charge-discharge cycling.
Figure 7:
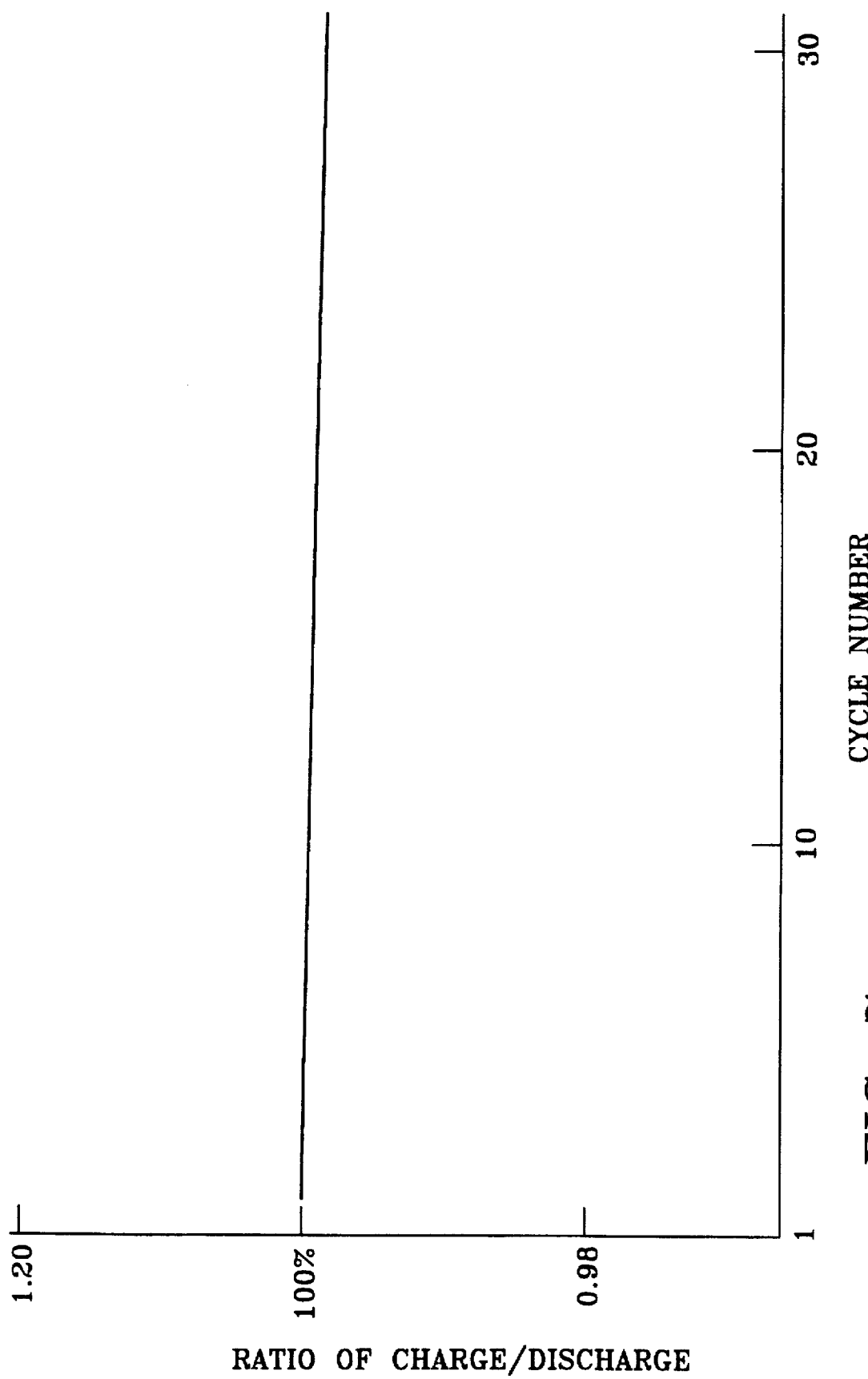
FIG. 7 is a plot of the cycling efficiency of an electrode made from the amorphous manganese oxide of the present invention over a number of cycles.
Figure 8:
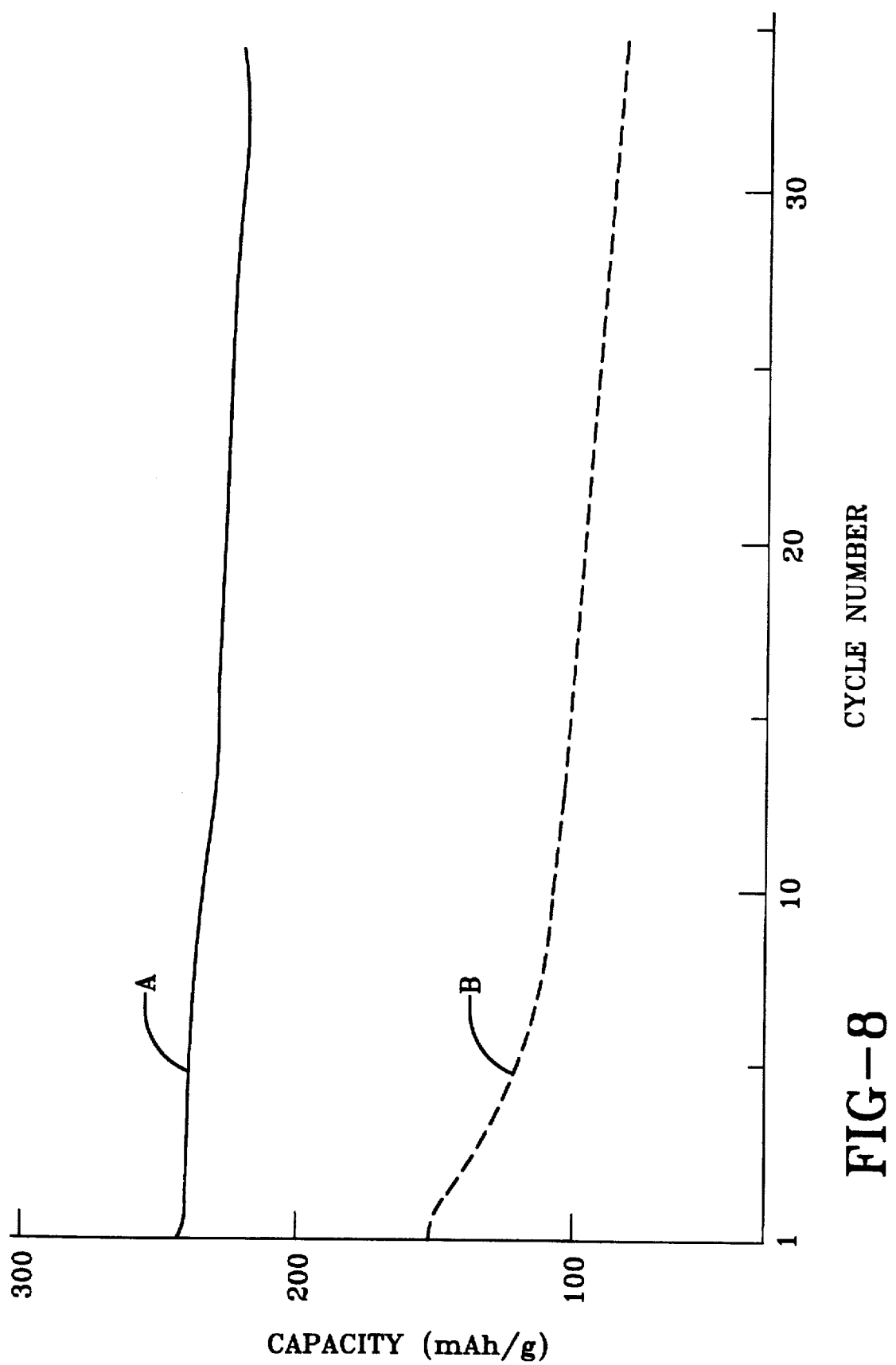
FIG. 8 are plots of the discharge capacities of spinel manganese oxide and the amorphous manganese oxide of the present invention over a number of cycles.

Example 3—Electrodes were made from the materials described in Example 2 by mixing varying amounts (i.e., 0 to 20% by weight) of conductive KS2 graphite powder therewith in inverse proportion to the concentration of the conductive polymer (i.e., polyaniline) therein. These mixes were further mixed with a solution comprising 4% by weight EPDM in a 50:50 volume ratio of cyclohexan and xylene and mechanically mixed for from 2 to 4 hours to form a slurry. The slurry was coated onto either an aluminum foil or a carbon-coated aluminum foil current collector for further tests and the coated current collector subjected to a vacuum of $10^{-3}$ Torr at a temperature of 100° C. for one (1) hour to remove any of the cyclohexan and xylene solvents that had not already evaporated. Test cells were made with the electrodes so made using lithium foil as an anode, and an electrolyte comprising either a one (1) molar solution of lithium perchlorate in propylene carbonate, or an one (1) molar solution of $LiPF_6$ in a 50:50 mixture of ethylene carbonate/dimethyl carbonate. A copper disk contacted the anode and an aluminum disk contacted the manganese oxide electrode to carry the cell current. Charge-discharge cycling of the cell was conducted using constant currents varying from 0.2 to 2 mA/cm² over a series of several tests. A Maccor battery cycler with a PC386 computer was used to cycle the cells and collect data. FIG. 6 shows voltage profiles for one such manganese oxide cathode cycled at a current density of 0.5 MA/Cm² between 2.5 volts and 4.2 volts. Curve 1 shows the voltage profile for the first full cycle. Curve 10 shows the voltage profile for the 10th cycle. Curve 20 shows the voltage profile for the 20th cycle. Curve 30 shows the voltage profile for the 30th cycle. The voltage profile maintains continuous gradients between the limiting voltages which is characteristic of amorphous materials. Moreover as the plot shows, most of the reversible capacity is below 4 volts where the electrolyte and electrode are stable. This is contrasted with spinel phase manganese oxide electrodes where most of the reversible capacity resides in a narrow high-voltage band between 4.0 and 4.2 volts (i.e. vs. lithium) and close to the decomposition potential of the electrolyte. Moreover, FIG. 6 also shows the cycling performance of the manganese oxide cathode. The symmetric charge-discharge curves indicate reversible and efficient performance of the cathode. FIG. 7 shows the chargedischarge-cycling efficiency of the cathode cycled in FIG. 6 and shows a near 100% cycling efficiency. Finally, FIG. 8 shows the discharge capacity (i.e., milliampere hours per gram) of amorphous manganese oxide of the present invention (curve A) compared to the discharge capacity of a spinel $LiMn_2O_4$ electrode cycled at the same current density in the same electrolyte.

Example 4—A number of samples were prepared with various amounts of polyaniline polymer therein (i.e., as a binder and conductive diluent substitute) to determine the affects of the polyaniline on the electrode's capacity (i.e., lithium intercalateability). A first solution (i.e., solution A) was prepared comprising 0.25 molar sodium permanganate acidified by $HClO_4$ to pH=1. A second solution (i.e., solution B) was prepared comprising 0.375 molar manganese nitrate. Various amount of aniline monomer was added to different amounts of solution B. This solution was blended to uniformly disperse the aniline in the manganese nitrate solution using a high speed blender. The mixed solution was added dropwise to, and rapidly stirred into 1000 ml of solution A maintained at 80° C. The exothermic reactions between the two solutions occurred and a uniform gel was formed that filled a volume of about 2000 ml. The gel was filtered under a vacuum of $10^{-3}$ Torr. The filtered gel was dried in a vacuum oven ($10^{-3}$ Torr) at 180° C. for about 4 hours. The dried gel powder was used as active material for making a battery electrode. A battery electrode was made from 2 grams of the gel powder. EPDM binder was first dissolved in a 50/50 cyclohexane/xylene solvent to make a 2% EPDM solution. KS-2 graphite powder was added as a conductive diluent. The amount of conductive KS-2 powder was adjusted according to the concentration of polyaniline in the metal oxide. The amount of polyaniline, manganese oxide powder, EPDM binder, and KS-2 used to make the test electrodes are listed in Table 1 for seven (7) samples including an aniline-free reference sample. The mixture of polyaniline, manganese oxide, EPDM binder, and diluent graphite powder was micronized for 15 minutes in an agate-ball type micronizing mill sold by McCrone to form a slurry with a thick-ink viscosity, and spread over an aluminum foil using a doctor blade technique. The coating was dried in air for 1 hour then further dried under a vacuum of $10^{-3}$ Torr at 100° C. for more than 1 hour. A disk electrode (diameter 2.54 cm) was punched out from the coating and used in an electrochemical cell having metallic lithium as a counter electrode, and 1M LiClO4 in ethylene carbonate/dimethyl carbonate (50/50 mole ratio) as the electrolyte. A Maccor battery cycler was used to cycle the cell between 2.0–4.3 volts at 0.2 $mA/cm^2$. Capacity of the active material in the electrodes was measured (mAh), normalized per its weight (mAh/g) and shown in Table 1 for each test sample. Table 1 also shows the polyaniline, $MnO_x$, EPDM and KS-2 content of each sample. These tests show that samples 1–4 which had $MnO_x$/polyaniline ratios between about 95/5 to 80/20 EPDM levels as low as 2% and KS-2 levels as low as 2% had higher capacities than the polyaniline-free reference electrode and electrodes (samples 5 & 6) having higher polyaniline content.

TABLE 1 composition and capacity of various composite electrode.

|  | B (ml) | Aniline (ml) | $MnO_x$/Polyaniline | EPDM binder (wt %) | KS-2 (wt %) | $MnO_x$ + PA (wt %) | Electrode Capacity (mAh/g) |
|---|---|---|---|---|---|---|---|
| Ref | 1000 | 0 | 00% $MnO_x$ | 5 | 10 | 85 | 196.4 |
| 1 | 917 | 5.63 | 95/5 | 2 | 7 | 91 | 203.38 |
| 2 | 834 | 11.25 | 90/10 | 2 | 5 | 93 | 200.18 |
| 3 | 751 | 16.87 | 85/15 | 2 | 3 | 95 | 198.23 |
| 4 | 668 | 22.50 | 80/20 | 2 | 2 | 96 | 198.02 |
| 5 | 585 | 28.13 | 75/25 | 2 | 2 | 96 | 186.17 |
| 6 | 502 | 33.76 | 70/30 | 2 | 2 | 96 | 181.34 |

While the invention has been disclosed in terms of certain specific embodiments thereof it is not intended to be limited thereto, but rather only to the extent set forth hereafter in the claims which follow.

What is claimed is:

1. In a secondary lithium-ion cell comprising an anode, a cathode and a non-aqueous, lithium-ion conducting electrolyte between said anode and cathode, the improvement wherein said cathode comprises submicron-size, amorphous, microporous, lithium-intercalateable, quatravalent, manganese oxide particles supported on an electrical conductor, said particles having an internal surface area greater than about 100 $m^2/g$.

2. A cell according to claim 1 wherein said manganese oxide has a particle size less than about 0.3 microns and an internal surface area greater than about 200 $m^2/g$.

3. In a secondary lithium-ion cell comprising an anode, a cathode and a non-aqueous, lithium-ion conducting electrolyte between said anode and cathode, the improvement wherein said cathode comprises submicron-size, amorphous, microporous, lithium-intercalateable, quatravalent, manganese oxide particles supported on an electrical conductor and bound together by an electrically conductive, lithium-intercalateable, polymer, said particles having an internal surface area greater than about 100 $m^2/g$.

4. A secondary cell according to claim 3 wherein said polymer is selected from the group consisting of polyaniline, polypyrole, polythiophene and derivatives thereof.

5. A secondary cell according to claim 4 wherein said polymer comprises polyaniline.

6. A secondary cell according to claim 5 wherein said polyaniline comprises up to about 22% by weight of the mixture of manganese oxide particles and polyaniline.

* * * * *